United States Patent [19]

Bach et al.

[11] 4,259,936
[45] Apr. 7, 1981

[54] DEVICE FOR ELECTRONICALLY CONTROLLING THE INTAKE AIR TEMPERATURE OF AN INTERNAL COMBUSTION ENGINE

[75] Inventors: Walter Bach, Steinheim; Rainer Blumhardt, Remseck; Rolf Füsser, Freiberg; Karl-Heinz Rückert, Marbach-Hörnle, all of Fed. Rep. of Germany

[73] Assignee: Filterwerk Mann & Hummel GmbH, Ludwigsburg, Fed. Rep. of Germany

[21] Appl. No.: 62,965

[22] Filed: Aug. 2, 1979

[30] Foreign Application Priority Data

Aug. 2, 1978 [DE] Fed. Rep. of Germany ....... 2833833

[51] Int. Cl.³ .......................................... F02M 31/00
[52] U.S. Cl. .................................... 123/556; 123/552
[58] Field of Search ...................... 123/122 D, 122 H; 236/13

[56] References Cited

U.S. PATENT DOCUMENTS

| 2,382,365 | 8/1945 | Carssow | 123/122 H |
|---|---|---|---|
| 2,414,296 | 1/1947 | Gill | 123/122 H |
| 3,787,037 | 1/1974 | Motooka | 123/122 H |
| 3,985,112 | 10/1976 | Jordan | 123/122 H |
| 4,078,379 | 3/1978 | Minami | 123/122 D |
| 4,144,857 | 3/1979 | Bendig | 123/122 D |
| 4,161,930 | 7/1979 | Bendig | 123/122 D |

*Primary Examiner*—Ronald H. Lazarus
*Attorney, Agent, or Firm*—Joseph A. Geiger

[57] ABSTRACT

A device for electronically controlling the intake air temperature of an internal combustion engine, featuring a temperature sensor in the clean air space of the filter, the signal from the sensor controlling an electromagnetically driven oscillator pump whose vacuum output adjusts the flapper of an air flow proportioning valve by means of a pneumatic actuator, until the correct ratio of cold and preheated raw air is admitted into the intake system for the establishment of an optimal combustion air temperature. An automatic lowering of this temperature under full-load operation is achieved by utilizing the negative pressure in the air intake manifold as a control means to shift the oscillating armature of the oscillator pump away from its maximum output position. In an air intake system for fuel-injected engines, a similar result is achieved by means of an air flow sensor whose output signal is superimposed on the control signal from the temperature sensor.

12 Claims, 4 Drawing Figures

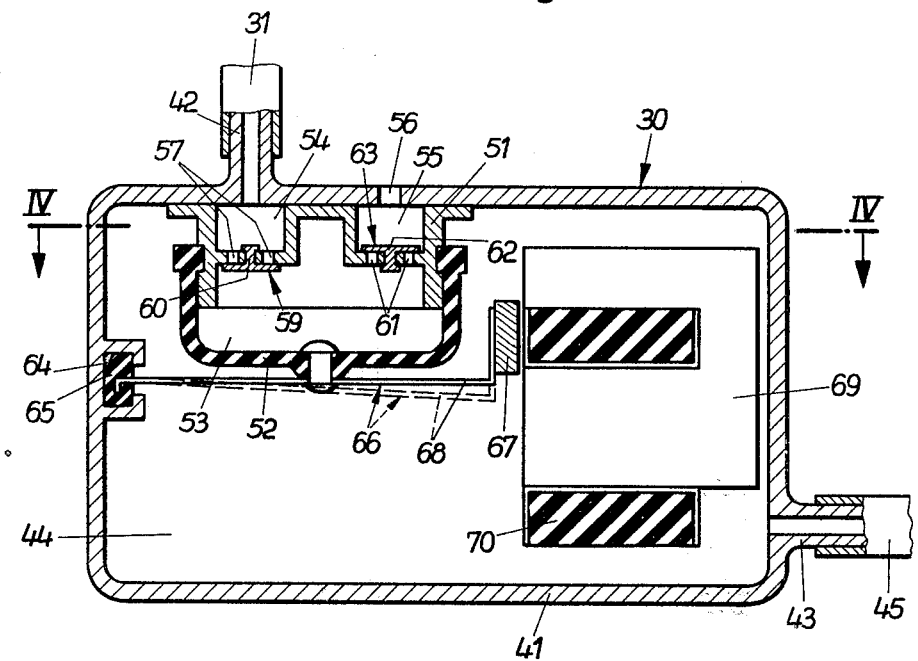

DEVICE FOR ELECTRONICALLY CONTROLLING THE INTAKE AIR TEMPERATURE OF AN INTERNAL COMBUSTION ENGINE

BACKGROUND OF THE INVENTION

1. Field of the Invention

The present invention relates to air intake systems for internal combustion engines, and, more particularly, to an air intake system which is adapted to establish and maintain a predetermined combustion air temperature by means of a flow proportioning valve which admits varying quantities of cold raw air and preheated raw air into the air intake system.

2. Description of the Prior Art

The temperature of the combustion air of an internal combustion engine affects not only its efficiency as an energy converter and its overall energy output, but also the completeness of combustion and, consequently, the emission of pollutants by the engine. Unfortunately, the optimal air temperature, for a maximum power output, is not the same as the optimal temperature for the minimization of pollutant production. The latter calls for a relatively high air temperature, in order to produce a better fuel-air mixture through more rapid vaporization of the fuel, whereas for a maximum power output at full load, it is desirable to use relatively cold raw air, in order to improve the volumetric efficiency of the engine; colder air being denser than warm air.

It has been found that these conflicting objectives are best served by adjusting the combustion temperature to a higher level for partial-load operation of the engine and to s lower level for full-load operation. Ideally, these temperature levels should be in the neighborhood of 30° C. and 10° C. The preheating of cold raw air during the warmup portion of engine operation has the additional advantage of accelerating the warmup process and of minimizing operation in a cold state in which the moving parts of the engine are poorly lubricated.

While it is not practical to lower the combustion air temperature through cooling means, if the ambient temperature is higher than the optimal temperature level, it is relatively easy to raise the air temperature from a low ambient temperature level, by using the exhaust system of the engine as a heat source. The prior art in this field contains a number of suggestions for supplying preheated raw air to the intake system of the internal combustion engine, most of them featuring a warm air intake duct which is connected to a so-called exhaust stove and which feeds warm air into a duct junction in the main intake duct which leads to the air intake filter of the engine. In the duct junction is arranged an adjustable air flow proportioning valve which, in one end position, closes the warm air intake duct while allowing a maximum flow through the cold air intake duct, and, as it progressively opens the warm air intake duct, restricts the flow from the cold air intake duct, until only preheated raw air enters the air intake system.

A favorite solution involves the arrangement of the duct junction and air flow proportioning valve in such a way that the warm air intake duct joins the larger horizontal cold air intake duct from below, forming a valve seat for a pivotable flapper valve. The flapper, when oriented horizontally, closes the warm air intake duct and, when moved to an upwardly inclined orientation, opens the warm air intake duct, while substantially closing the cold air intake duct. Various drive means are used to control the angular position of the flapper, in order to achieve the desired air mixture and temperature adjustment.

The German Pat. No. 20 17 983 discloses a flapper valve which is connected to the drive rod of a longitudinally expanding and contracting wax thermostat. This thermostat may be arranged either inside the air intake duct, downstream of the duct junction, or on the outside of the intake duct system. In each case, the wax thermostat moves its drive rod in response to a heating coil which is energized electrically, in accordance with a temperature signal received from a sensor in the air intake system, upstream of the carburetor. The temperature signal is amplified and converted by a signal transformer. This prior art solution has the shortcoming that its response to temperature changes is slow and that it does not make adjustments for different temperature levels for partial-load operation and full-load operation.

A different solution is disclosed in U.S. Pat. No. 3,726,512 which suggests a pneumatic membrane actuator connected to the pivotable flapper valve, the actuator receiving negative pressure from the engine intake manifold, downstream of the carburetor throttle, the negative pressure being adjustably reduced by means of a thermostatically controlled relief valve. The latter is arranged inside the clean air space of the air intake filter, upstream of the carburetor, so that its thermostatic member is responsive to the temperature of the incoming combustion air. An increase in this temperature progressively opens an air intake passage in the relief valve, so as to reduce or eliminate the negative pressure which is transmitted to the membrane actuator. A return spring in the actuator then extends the actuator drive rod to move the flapper valve towards the position in which it closes the warm air intake duct.

Like the previously described device, this prior art solution reacts to temperature changes with considerable inertia, tending also to overshoot the equilibrium position. However, the use of negative pressure from the engine intake manifold as a drive medium offers the possibility of achieving a lower combustion air temperature under full-load operation, because, with a fully open carburetor throttle, the engine intake does not generate enough negative pressure in the drive system to move the flapper away from its rest position in which the warm air intake duct is closed, whether the ambient air temperature is high or low.

SUMMARY OF THE INVENTION

Underlying the present invention is the primary objective of achieving an improved solution to the temperature adjustment problem outlined further above, using components which are simple and suitable for mass production. The intended solution is to have better response characteristics, under changing operating conditions, while offering extended operational reliability.

The present invention proposes to attain this objective by suggesting a device for electronically controlling the temperature of the combustion air in the air intake system of internal combustion engines by means of a temperature sensor which is arranged upstream of the carburetor, preferably in the clean air space of the air intake filter, and which supplies an electrical control signal to an electromagnetically driven oscillator pump whose pressure output controls the pneumatic actuator of the air flow proportioning valve.

The desired automatic adjustment of the combustion air temperature for full-load operation, as contrasted with partial-load operation, is achieved by correspondingly decreasing the suction output of the oscillator pump, in one of two proposed ways:

In a carburetor-equipped engine, the operating condition is reflected by the negative pressure which exists in the air intake manifold, downstream of the carburetor throttle, where the negative pressure decreases with increasing engine load. This negative pressure is used to shift the position of the oscillating armature with respect to the electromagnet of the oscillating unit, thereby increasing or decreasing the pump output, as the case may be. In a preferred embodiment of the invention, this interaction is achieved by surrounding the oscillator pump with a closed pump housing and by subjecting the interior of this housing to the negative pressure which is generated downstream of the carburetor throttle. A change in pressure inside the pump housing results in a corresponding position shift of the flexible diaphragm cap of the oscillator pump and of the attached arm of the oscillating armature.

A comparable adjustment can be achieved with electronic means, using an air flow sensor in the engine intake system to produce an electrical control signal which reflects the engine operating condition, as a function of the rate at which combustion air is consumed. This control signal is then fed to the same signal transformer which controls the oscillating unit of the oscillator pump, in response to the control signal received from the temperature sensor. The combustion air flow sensor is preferably a heated, temperature-sensitive resistor which is exposed to the incoming combustion air and which, depending on the degree of cooling undergone, generates a signal which is indicative of the air flow rate.

This approach can be used for carburetor-equipped engines, as well as for fuel injection engines, where the suction-producing throttle is absent.

The pneumatic actuator and the oscillator pump, while preferably using negative pressure as a drive medium, may also be adapted to operate under positive pressure. In both cases, the supply line between the two units has a calibrated orifice through which a small stream of air continuously enters or exits the sytem, under negative or positive pressure, respectively, thereby improving the responsiveness of the pneumatic actuator, especially when the pumping action decreases.

BRIEF DESCRIPTION OF THE DRAWINGS

Further special features and advantages of the invention will become apparent from the description following below, when taken together with the accompanying drawings which illustrate, by way of example, several embodiments of the invention, represented in the various figures as follows:

FIG. 3 shows, in an enlarged longitudinal cross section taken along line III—III of FIG. 4, an electromagnetically driven oscillator pump of a type which is used in the temperature control devices of FIGS. 3 and 4; and FIG. 4 shows another section through the device of FIG. 3, as taken along line IV—IV thereof.

DESCRIPTION OF THE PREFERRED EMBODIMENTS

Figure 1:
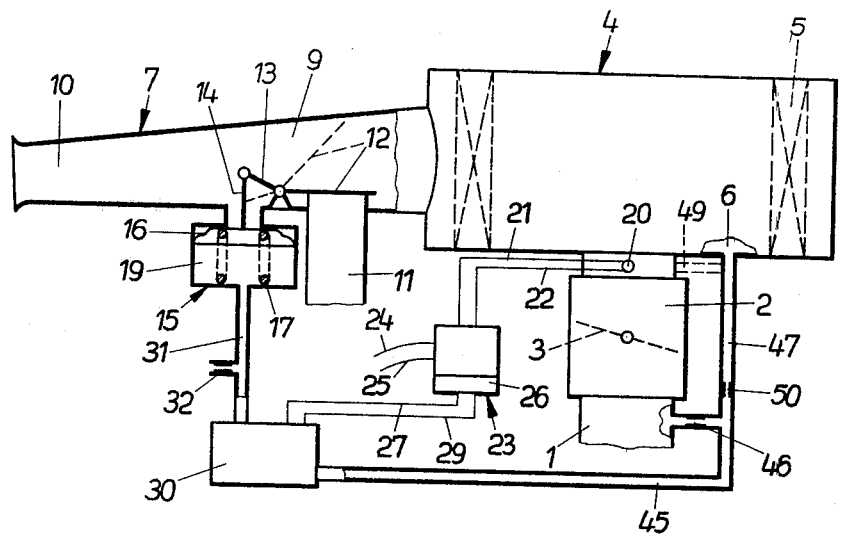
FIG. 1 shows, in a schematic representation, an air intake system for a carburetor-equipped internal combustion engine, incorporating therein the temperature controlling device of the present invention.

Referring to FIG. 1 of the drawing, there is shown, in a schematic representation, an air intake system for a carburetor-equipped internal combustion engine, the engine itself being not shown. This air intake system consists essentially of an air intake manifold 1 which is part of the internal combustion engine and which carries a carburetor 2 with a main throttle 3. The carburetor 2, in turn, carries an air intake filter assembly 4 with an annular filter element 5, through which the incoming combustion air passes radially inwardly into the clean air space 6.

The air intake filter assembly 4 has attached to its vertical housing wall a horizontally extending air intake snorkel 7 which opens into the air intake filter 4 through a raw air mixing duct 9. Into the raw air mixing duct 9 leads a cold air intake duct 10, defined by the outer portion of the air intake snorkel 7, and a warm air intake duct 11 which joins the snorkel 7 from below, at a duct junction. The warm air intake duct 11, of which only the upper portion is shown, supplies preheated raw air which has previously passed through an exhaust stove, i.e. a heat exchanger, where heat from the exhaust system is transmitted to the incoming raw air.

In the area of the duct junction, inside the air intake snorkel 7, is arranged an air proportioning valve which features a pivotable flapper 12 with a transversely oriented horizontal pivot axis, located a short distance upstream of the warm air intake duct 11. To the pivot arm 13 of the flapper valve 12 is attached the drive rod 14 of a pneumatic membrane actuator 15. The latter features a housing which is mounted on the bottom side of the air intake snorkel 7, the housing enclosing a rubber membrane 16 and an actuator return spring 17 which is arranged inside a control pressure space 19, defined between the housing and the membrane 16.

At a point downstream of the duct junction, preferably inside the clean air space 6 of the air intake filter 4, or just downstream thereof, is arranged an electrical temperature sensor 20 whose purpose it is to produce an electrical control signal which is indicative of the temperature of the incoming combustion air, after the cold raw air and the preheated raw air have been mixed together. Conveniently, the temperature sensor 20 is a heat-sensitive resistor whose resistance increases or decreases, as a function of the resistor temperature, thereby producing a correspondingly increasing or decreasing signal output. Electrical leads 21 and 22 transmit the temperature signals to a signal transformer 23. This unit receives direct current from the starter battery (not shown) of the internal combustion engine, or from some other suitable power source.

Figure 2:
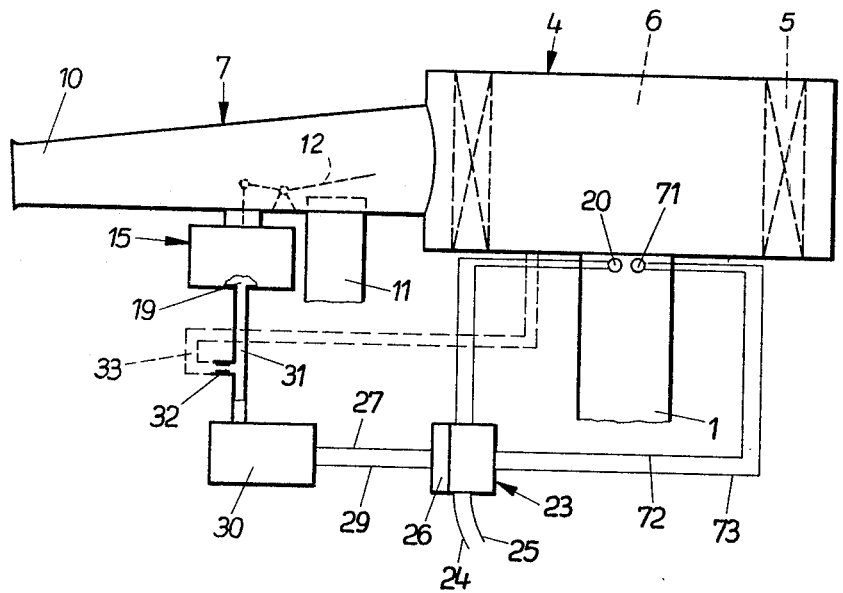
FIG. 2 shows a similar arrangement of an air intake system for a fuel-injected engine, incorporating therein a different embodiment of the present invention.

The signal transformer 23 includes a converter 26 which operates under the control of the variable signal input received from the temperature sensor 20, and its correspondingly varying output is transmitted to an oscillator pump 30, over leads 27 and 29. The oscillator pump 30 is a small vacuum pump, producing a variable negative pressure which is transmitted to the pressure control space 19 of the pneumatic actuator 15, via a supply line 31. The latter has a small relief bore, in the form of a calibrated orifice, which allows for a tiny air flow from the atmosphere to the inside of the negative pressure system by which the oscillator pump 30 and the pneumatic actuator 15 interact. FIG. 2 shows a further improvement of this aspect of the invention, suggesting that the relief bore be part of a return line which leads to the clean air space 6 of the air intake filter 4. The return line 33 prevents the aspiration of dust particles through the relief bore 32 into the pressure system of the flapper drive. It should be understood, of course, that the possibility of adding a return line 33 also applies to the air intake system of FIG. 1.

FIGS. 3 and 4 show the oscillator pump 30 of FIGS. 1 and 2 in cross section and at a much larger scale. The pump assembly consists essentially of a pump housing 41 and a pump cover 40 which form an airtight outer pump chamber 44. On one wall of the pump housing 41 is arranged an inlet connector 42 for the supply line 31 to the pneumatic actuator 15 and on another wall, a suction connector 43 for a vacuum control line 45 which forms a connection to the air intake manifold 1, downstream of the carburetor throttle 3.

The vacuum control line 45 transmits to the outer pump chamber 44 of the oscillator pump 30 any negative pressure that may be present in the air intake manifold 1. A throttling member in the form of a calibrated orifice 46 in the vacuum control line 45 dampens the effect of any sudden changes in the pressure conditions inside the air intake manifold 1. A bypass line 47 with a calibrated orifice 50 connects the outer pump chamber 44 to the clean air space 6 of the air intake filter 4. As shown at 49, the bypass line 47 could also open into the air intake duct, just upstream of the carburetor 2. The purpose of this bypass line is to prevent the passage of fuel vapors into the pump chamber 44, when the negative pressure inside the air intake manifold 1 drops, and air is drawn into the pump chamber 44, through its vacuum control line 45. The bypass line 47 assures that this air comes from the clean air space 6.

FIG. 3 shows that the pump housing 41 encloses in its outer pump chamber 44 a pump base 51. The latter is sealingly attached to a side wall of the pump housing 41 and carries a flexible diaphragm cap 52. Between the pump base 51 and the diaphragm cap 52 is thus formed a pumping chamber 53. The bottom side of the pump base 51 is so arranged that the base and the side wall of the pump housing 41 form an inlet compartment 54 and an outlet compartment 55 for the pump. The inlet compartment 54 communicates with the inlet connector 42 of the suction supply line 31, and the outlet compartment 55 has an outlet port 56 to the atmosphere, across the wall of the pump housing 41. In the partition wall between the pumping chamber 53 and the inlet compartment 54 is arranged an inlet valve 59, in the form of a pair of valve passages 57 which are covered by a flexible valve member 60. The latter opens during the suction stroke of the pump, when the diaphragm cap 52 moves away from the pump base 51. An outlet valve 63 is arranged in the partition wall between the pumping chamber 53 and the outlet compartment 55, having similar valve passages 61 and a flexible valve member 62. This valve opens during the exhaust stroke, when the diaphragm cap 52 moves towards the pump base 51.

The pumping movements of the diaphragm cap 52 are produced by the oscillating movements of an armature 66 which is part of an oscillator unit. The oscillating armature 66 consists of an oscillator arm 68 which carries a permanently magnetized armature head 67, the arm 68 reaching transversely across the diaphragm cap 52 to a pivot attachment on the side wall of the pump housing 41. This pivot attachment takes the form of a retaining groove 64 which holds a rubber block 65 inside which the angled-off extremity of the oscillator arm 68 is permanently embedded. A rivet connection in the center of the diaphragm cap 52 attaches the latter to the oscillator arm 68. The pumping movements of the oscillator arm 68 are produced through the interaction of the armature head 67 with a U-shaped iron core 69 which is magnetized by an alternating current flowing in the coil 70, the current intensity being controlled by the temperature signal from the sensor 20.

The operation of the control device of the invention takes into account the temperature of the internal combustion engine, its load condition, and the ambient temperature of the environment. Assuming an initial set of conditions to involve the startup of a cold engine, at the low ambient temperature, with partial load, it is further assumed that the desired optimal combustion air temperature be 30° C. Under these conditions, the temperature sensor 20 transmits to the signal transformer 23 a temperature signal which reflects a below-optimal temperature, thus causing the converter 26 to supply a higher alternating voltage to the magnetic coil 70 of the oscillator pump 30. The result is a greater axial stroke of the oscillating armature 66 and attached diaphragm cap 52, reflecting itself in an increased suction output of the pump and the transmission of a correspondingly higher negative pressure to the control pressure space 19 of the pneumatic actuator 15.

While there is a constant small flow of air being admitted into the supply line 31, through its relief bore 32, this flow is sufficiently outweighted by the suction output of the oscillator pump, so that the rubber membrane 16 of the actuator is pulled downwardly, against the action of the actuator return spring 17, and the flapper 12 is pivoted away from its rest position in which it shuts off the outlet of the warm air intake duct 11. Initially, this flapper position adjustment may involve a movement of the flapper 12 into the extreme opposite position which is shown by dotted lines in FIG. 1. In this flapper position, the cold air intake duct 10 is closed off and only preheated raw air is drawn in from the warm air intake duct 11.

As the exhaust stove of the engine gets warmer, and the raw air supplied by the warm air intake duct 11 increases in temperature, the combustion air flowing past the temperature sensor 20 approaches more and more the optimal temperature of 30° C. The resistor of the temperature sensor 20 responds with a correspondingly higher resistance and with a correspondingly weaker signal to the transformer 23 and converter 26, with the result that the oscillating unit receives a reduced input. This reduced pump input, in turn, reflects itself in a lesser negative pressure in the supply line 31 and in the control pressure space 19 of actuator 15. This allows the return spring 17 to push the membrane 16 upwardly, until, in an equilibrium position, just so much preheated air from the warm air intake duct 11 is admixed to the cold raw air from the cold air intake duct 10 that the optimal combustion air temperature of 30° C. is established and maintained. In this equilibrium position, the oscillator pump draws exactly that amount of air from the supply line 31 which is allowed to enter through its relief bore 32.

The above-described equilibrium condition, under partial-load operation of the internal combustion engine, means that the outer pump chamber 44 of the oscillator pump 30 is subjected to the comparatively high negative pressure which is present in the air intake manifold 1, as a result of the flow-throttling action of the carburetor throttle 3. The presence of this negative pressure in the outer pump chamber 44 means that the diaphragm cap 52 bulges axially outwardly, as compared to the shape it would assume in the absence of such negative pressure. In FIG. 3, this position shift is indicated by the dotted-line position of the oscillating armature 66.

Accordingly, under the set of startup conditions listed further above, the mid-position of the oscillating armature is that indicated by the dotted lines. The oscillator unit is so positioned that the dotted line position of its armature produces a larger oscillation stroke than the full-line position reflecting the absence of negative pressure.

Accordingly, if the load setting of the internal combustion engine is increased, through a pivoting displacement of the carburetor main throttle 3, a reduction in the negative pressure which is supplied to the pump housing 41 takes place, so that the oscillating range of the diaphragm cap 52 is shifted towards the pump base 51, and the mid-position of the oscillating armature 66 shifts to the normal position which is shown in full lines in FIG. 3. This armature position reflects full-load operation of the internal combustion engine. In this position, the oscillating unit, although receiving an unchanged input current, transmits reduced pumping forces to the diaphragm cap 52. This results in a further relaxation of the negative pressure which is transmitted to the pneumatic actuator 15 and in a correspondingly reduced, or completely cut off, admission of preheated raw air to the air intake system.

The degree to which the load-reflective negative pressure in the air intake manifold 1 will lower the combustion air temperature from the optimal level of 30° C, when the engine is subjected to full load operation, depends not only on the position of the oscillator unit inside the valve housing 41, but also on the size of the calibrated orifices 46 and 50 in the vacuum control line 45 and bypass line 47, respectively. It has been found to be desirable to adjust the system in such a way that the combustion air temperature is automatically lowered to 10° C, when the engine operates at full load.

The earlier-mentioned small calibrated orifices 46 and 50, by limiting the speed with which pressure changes are transmitted to the oscillator pump 30, assure that the system is not thrown out of equilibrium, if the engine is only briefly subjected to full load, as when it is merely "revved up". The automatic lowering of the optimal combustion air temperature to 10° C. for full load operation presumes, of course, that the ambient temperature is at, or below, this level. At a higher ambient temperature, the result is simply a closing off of the warm air intake duct 11, so that only cold raw air is drawn into the system.

The air intake system which is illustrated in FIG. 2 is very similar to that which is shown in FIG. 1, identical components being identified by the same reference numerals. This air intake system differs from the previously described system primarily in that it does not include a carburetor. It is therefore particularly suited as an air intake system for fuel-injected internal combustion engines. It should be understood, however, that this air intake system is also compatible with any carburetor-equipped engine.

A comparison between FIG. 1 and FIG. 2 shows that the general arrangement of the air intake ducts, pneumatic actuator 15, and oscillator pump 30 are essentially unchanged. The difference between the two systems centers around the way in which the air proportioning valve is automatically adjusted for a colder combustion air temperature, when the engine operates under full load. In FIG. 2, this adjustment is accomplished by means of a flow sensor 71 which is arranged in the air intake manifold 1, preferably in the vicinity of, or in an assembly with the temperature sensor 20.

The flow sensor 71 consists essentially of a heated resistor which is exposed to the air flow and which, depending on the speed and temperature of that air flow, is cooled to a greater or lesser extent, so that it will present a higher or lower resistance to a signal current. The resulting electrical signal, therefore, is indicative of the flow speed of the combustion air, and hence, of the engine operating speed and load condition. The electrical leads 72 and 73 transmit the air consumption signal from the sensor 71 to the signal transformer 23, where it is added to the temperature signal from the sensor 20, using a suitable bridge circuit. This circuit is so arranged that a change in the consumption signal which indicates a higher air consumption will affect the temperature signal in the same way as would an increase in the combustion air temperature. The result is a new flapper setting for a lower combustion air temperature. This offsetting action takes place continuously, so that the adjusted combustion air temperature follows a gradient, from a maximum of 30° C, for example, to a minimum of 10° C, for example, as the engine operating condition changes from partial load to full load. On the other hand, it is also possible to arrange the bridge circuit in the signal transformer 23 in such a way that a stepped, rather than a continuous correction is obtained, in which case the combustion air temperature is maintained at 30° C, until the half-load condition is reached, for example, whereupon a temperature adjustment to 10° C. takes place.

The signal output of the heated resistor of the flow sensor 71, aside from reflecting the flow speed itself, also depends, to some degree, on the temperature of the incoming combustion air. However, this signal-distorting influence of the air temperature can be compensated for, by utilizing the temperature signal from the sensor 20 as a compensation control factor. The necessary compensating circuitry can be incorporated in the bridge circuit which combines the signals from the sensors 20 and 71 for the signal transformer 23.

While it has been found preferable to use negative pressure for the operation of the pneumatic actuator 15, as featured in both air intake systems described above, this should not be viewed as a necessary condition for the successful application of this invention. Thus, it is equally possible to employ the same oscillator pump 30 to produce an output of positive pressure, and to connect the pressure outlet port of the pump to the pneumatic actuator 15. In this case, the actuator would preferably be arranged on top of the air intake snorkel 7, and the actuator return spring would be arranged on the opposite side of the rubber membrane 16. The overall operation of such a pressure system would be the same as that of the vacuum system which has been described above. In the pressure system, the relief bore in the supply line between the actuator and the oscillator pump could be open to the atmosphere, but the air inlet to the oscillator pump would instead be connected to the clean air space of the air intake filter, to prevent the aspiration of dust particles.

It should be understood, of course, that the foregoing disclosure describes only preferred embodiments of the invention and that it is intended to cover all changes and modifications of these examples of the invention which fall within the scope of the appended claims.

We claim the following:

1. A device for controlling the temperature of the combustion air in the air intake system of an internal combustion engine, comprising in combination:
    a cold air intake duct for the intake of air of ambient temperature;
    a warm air intake duct for the intake of preheated air coming from an air heater associated with the engine;
    a duct junction, where the cold air intake duct joins the warm air intake duct;
    a combustion air duct leading from the duct junction to the cylinder or cylinders of the internal combustion engine;
    an air flow proportioning valve associated with the cold air and warm air intake ducts, the valve being adjustable in its position so as to progressively open one of the two ducts while correspondingly closing the other, in order to adjust the relative quantities of cold air and preheated air which are drawn into the combustion air duct;
    means for sensing the air temperature in the combustion air duct and for generating an electrical control signal which is indicative of the temperature level;
    means for adjusting the position of the air flow proportioning valve in response to the electrical control signal generated by the temperature sensing means, so that, when the temperature in the combustion air duct rises, the corresponding control signal from the temperature sensing means induces the valve position adjusting means to adjust the air flow proportioning valve in the direction of closing the warm air intake duct and opening the cold air intake duct; and
    means responsive to the volume of combustion air consumed by the engine, as a function of the engine speed and operating load, said air-consumption-responsive means being operable in such a way that, at increasing rates of air consumption, under temperature conditions at which the temperature-indicative electrical control signal would act to admit preheated air, said action is progressively more offset, so as to restrict the admission of preheated air and to establish a lower combustion air temperature.

2. A combustion air temperature controlling device as defined in claim 1, wherein
    the valve position adjusting means includes a pneumatic actuator which is connected to the valve in such a way that an increase in pressure supplied to the actuator produces a valve adjustment in the direction of opening the warm air intake duct, and the actuator includes an actuator return spring which, in response to a decrease in pressure, produces a valve adjustment in the opposite direction; and
    the valve position adjusting means further includes an oscillator pump which supplies variable pressure to the pneumatic actuator, the pump being driven by an electromagnetic oscillating unit whose energy input is controlled by the value of said temperature-indicative electrical control signal.

3. A combustion air temperature controlling device as defined in claim 2, wherein
    the valve position adjusting means further includes a signal transformer which connects the temperature sensing means to the electromagnetic oscillating unit of the oscillator pump, the signal trnasformer having a power supply and a converter for the generation of pump-driving oscillations by the oscillating unit.

4. A combustion air temperature controlling device as defined in claim 2 or claim 3, wherein
    the pneumatic actuator is adapted to respond to negative pressure;
    the oscillator pump is a vacuum pump; and
    the vacuum system defined by the vacuum pump and the pneumatic actuator includes a calibrated inlet orifice for the admittance of a small flow of air which reduces the negative pressure in the vacuum system, as soon as the oscillator pump produces less negative pressure, in response to a reduced energy input to its oscillating unit.

5. A combustion air temperature controlling device as defined in claim 2, wherein
    the internal combustion engine is of the type having a carburetor with a throttle;
    the oscillator pump has a flexible pumping member which encloses a portion of a pumping chamber and is attached to a moving arm of the oscillator unit, which thereby generates a pumping action in said chamber;
    the air-consumption-responsive means includes an outer pump chamber enclosing at least a major portion of the outer side of the flexible pumping member, so that, when a negative pressure is applied to said outer chamber, the flexible pumping member is deformed, with the result of shifting the movement range of the attached oscillator arm in such a way that the pumping action of the oscillator pump is increased in intensity;
    the air-consumption-responsive means further includes a vacuum line connecting the outer pumping chamber to a point downstream of the carburetor throttle, where low air consumption of the engine creates a relatively high negative pressure and high air consumption creates a relatively low negative pressure.

6. A combustion air temperature controlling device as defined in claim 5, wherein
    the air-consumption-responsive means further includes a bypass line connecting a point upstream of the carburetor throttle with the outer pump chamber; and
    the vacuum line and the bypass line have each a calibrated throttling orifice.

7. A combustion air temperature controlling device as defined in claim 5, wherein
    the pneumatic actuator is adapted to respond to negative pressure, and the oscillator pump is a vacuum pump.

8. A combustion air temperature controlling device as defined in claim 5, wherein
    the outer pump chamber is a part of the interior space of a pump housing which encloses the oscillator pump with its electromagnetic oscillating unit.

9. A combustion air temperature controlling device as defined in claim 2, wherein the air-consumption-responsive means includes means for sensing the flow rate in the air intake system, at a point downstream of the duct junction, including means for generating an electrical control signal which is indicative of the combustion air flow rate; and the valve position adjusting means further includes a signal transformer with a power supply for the electromagnetic oscillating unit which drives the oscillator pump, and circuit means for feeding the temperature-indicating control signal and the flow-rate-indicating control signal to the signal transformer.

10. A combustion air temperature controlling device as defined in claim 9, wherein the flow rate sensing means includes an electrically heated temperature-sensitive resistor which is exposed to the combustion air flow, being cooled by the latter to a temperature which is indicative of the air flow rate.

11. A device for controlling the temperature of the combustion air in the air intake system of an internal combustion engine, comprising in combination:

a cold air intake duct for the intake of air of ambient temperature;

a warm air intake duct for the intake of preheated air coming from an air heater associated with the engine;

a duct junction, where the cold air intake duct joins the warm air intake duct;

a combustion air duct leading from the duct junction to the cylinder or cylinders of the internal combustion engine;

an air flow proportioning valve associated with the duct junction, the valve having a pivotable flapper which is so arranged that, in its rest position, it closes the warm air intake duct, while fully opening the cold air intake duct, and, as it is pivoted away from the rest position, progressively opens the warm air intake duct, while closing the cold air intake duct;

a pneumatic actuator connected to the flapper of the air flow proportioning valve in such a way that an increase in pressure supplied to the actuator produces a corresponding flapper movement away from its rest position, in opposition to an actuator return spring urging the flapper towards its rest position;

a pump capable of supplying variable air pressure to the pneumatic actuator, in response to a variable electrical input signal; and an air temperature sensor arranged in the combustion air duct, the sensor determining the value of said electrical input signal for the pump, whereby an increase in the combustion air temperature produces an input signal for a correspondingly reduced pressure supply to the actuator.

12. A combustion air temperature controlling device as defined in claim 11, wherein the pneumatic actuator is adapted to respond to negative pressure;

the pump is an oscillator-type vacuum pump, being driven by an electromagnetic oscillating unit with a power source and a signal transformer; and the temperature sensor is connected to the signal transformer, so that its output signal controls the driving output of the oscillating unit.

* * * * *